United States Patent [19]

Matsumoto

[11] Patent Number: 5,745,325
[45] Date of Patent: Apr. 28, 1998

[54] MAGNETIC DISK DRIVE HAVING AN IMPROVED OUTER STOPPER MECHANISM

[75] Inventor: Takashi Matsumoto, Kawasaki, Japan

[73] Assignee: Fujitsu Limited, Kawasaki, Japan

[21] Appl. No.: 795,449

[22] Filed: Feb. 4, 1997

Related U.S. Application Data

[63] Continuation of Ser. No. 515,376, Aug. 15, 1995, abandoned.

[30] Foreign Application Priority Data

Dec. 28, 1994 [JP] Japan .................................. 6-326895

[51] Int. Cl.$^6$ ..................................................... G11B 5/54
[52] U.S. Cl. ............................................ 360/105; 360/106
[58] Field of Search ....................................... 360/106, 105

[56] References Cited

U.S. PATENT DOCUMENTS

| | | | |
|---|---|---|---|
| 4,949,206 | 8/1990 | Phillips et al. | 360/106 |
| 5,134,608 | 7/1992 | Strickler et al. | 369/215 |
| 5,193,037 | 3/1993 | Pace | 360/106 |
| 5,448,436 | 9/1995 | Albrecht | 360/105 |

FOREIGN PATENT DOCUMENTS

| | | |
|---|---|---|
| 60-79572 | 5/1985 | Japan . |
| 60-223083 | 11/1985 | Japan . |
| 3-69074 | 3/1991 | Japan ...................... 360/105 |
| 4-3377 | 1/1992 | Japan . |
| 4-125866 | 4/1992 | Japan . |
| 4-45351 | 4/1992 | Japan . |
| 4-263175 | 9/1992 | Japan . |
| 4-301273 | 10/1992 | Japan . |

*Primary Examiner*—Stuart S. Levy
*Assistant Examiner*—William Korzuch
*Attorney, Agent, or Firm*—Greer, Burns & Crain, Ltd

[57] ABSTRACT

A magnetic disk drive which can reduce a position tolerance of stoppers to increase a recording capacity. The magnetic disk drive includes an inner stopper fixed to a base and adapted to abut against an actuator arm to inhibit excess inward movement of the actuator arm beyond the innermost track of a magnetic disk, and an outer stopper mounted on the base and adapted to abut against the actuator arm to inhibit excess outward movement of the actuator arm beyond the outermost track of the magnetic disk. The outer stopper is movable between an upper position where the outer stopper comes into abutment against the actuator arm to inhibit the excess outward movement of the actuator arm and a lower position where the outer stopper does not come into abutment against the actuator arm to allow loading of a magnetic head over the magnetic disk.

5 Claims, 8 Drawing Sheets

MAGNETIC DISK DRIVE HAVING AN IMPROVED OUTER STOPPER MECHANISM

This application is a continuation of application Ser. No. 08/515,376 filed on Aug. 15, 1995, now abandoned.

BACKGROUND OF THE INVENTION

1. Field of the Invention

The present invention relates generally to a magnetic disk drive, and more particularly to a stopper mechanism for limiting the swing range of a head actuator in the magnetic disk drive.

2. Description of the Related Art

In a magnetic disk drive, data is read/written on a data zone of a rotating magnetic disk by a magnetic head mounted on the front end portion of a head actuator.

An actuator stopper is provided to limit the swing range of a rotary head actuator. The actuator stopper serves to prevent the magnetic head mounted on the front end portion of the head actuator from leaving the magnetic disk, for example, when the head actuator runs away for any reason. Further, a starting point of servo track writing is defined by the position of the actuator stopper.

In an actuator stopper mechanism of a conventional magnetic disk drive, an inner stopper and an outer stopper are fixed by bonding or press-fitting to a magnetic circuit fixed to a base of the magnetic disk drive, and a coil supporting portion of a head actuator is made to contact with the inner stopper or the outer stopper to thereby limit the swing range of the head actuator. Another magnetic disk drive known in recent years is such that both the stoppers are not provided in the magnetic circuit, but the outer stopper is provided in the magnetic circuit and the inner stopper is fixed to the base so as to abut against the front end portion of an actuator arm.

A rubber stop is mounted on the front end portion of each of the inner stopper and the outer stopper. The rubber stop serves to reduce an impact acceleration when the head actuator runs away for any reason to collide with the inner stopper or the outer stopper, thereby preventing a blemish on the surface of the magnetic disk due to the possibility that the magnetic head mounted on the head actuator may tap on the surface of the magnetic disk.

As one means for increasing a recording capacity in the magnetic disk drive, it is known to widen the data zone of the magnetic disk. The data zone varies with a position tolerance of the inner stopper or the outer stopper. Accordingly, the data zone can be widened by minimizing the position tolerance of the stoppers. In the magnetic disk drive wherein both the inner stopper and the outer stopper are provided in the magnetic circuit, the data zone is influenced not only by the position tolerance of the inner stopper and the outer stopper but also by the position tolerance of the magnetic circuit, because the magnetic circuit is fixed to the base of the magnetic disk drive. In consideration of this, the inner stopper only is located so as to abut against the actuator arm in the vicinity of its front end portion as mentioned above to thereby eliminate the position tolerance of the magnetic circuit.

In the case where both the stoppers are provided in the magnetic circuit, the position tolerance of the stoppers is amplified at the position of the magnetic head because the distance from the center of rotation of the head actuator to the magnetic head is relatively long. However, this problem can be prevented by locating the inner stopper in the vicinity of the front end portion of the actuator arm. In such a conventional magnetic disk drive, however, only the inner stopper is located in the vicinity of the front end portion of the actuator arm, but the outer stopper is located yet in the magnetic circuit fixed to the base.

There may be two reasons why the outer stopper is located yet in the magnetic circuit. Firstly, if the outer stopper is fixed to the base so as to abut against the actuator arm in the vicinity of its front end portion as similar to the inner stopper, the actuator arm is blocked by the outer stopper in loading the magnetic head over the magnetic disk, so that the magnetic head cannot be loaded over the magnetic disk. Secondly, if the outer stopper is located in the vicinity of the front end portion of the actuator arm after loading the magnetic head over the magnetic disk, the outer stopper lies under the magnetic disk, so that it is difficult to fix the outer stopper by a screw or the like in assembling the magnetic disk drive.

SUMMARY OF THE INVENTION

It is therefore an object of the present invention to provide a magnetic disk drive which can reduce the position tolerance of the stoppers to increase a recording capacity.

In accordance with an aspect of the present invention, there is provided a magnetic disk drive comprising a housing having a base; a magnetic disk rotatably mounted in the housing and having a plurality of tracks; a magnetic head for performing read/write of data on the magnetic disk; a head actuator for moving the magnetic head across the tracks of the magnetic disk, the head actuator having an actuator arm rotatably mounted on the base and a suspension having one end fixed to a front end of the actuator arm and having another end supporting the magnetic head; an inner stopper fixed to the base and adapted to abut against the actuator arm to inhibit excess inward movement of the actuator arm beyond an innermost one of the tracks of the magnetic disk; and an outer stopper mounted on the base and adapted to abut against the actuator arm to inhibit excess outward movement of the actuator arm beyond an outermost one of the tracks of the magnetic disk; the outer stopper being movable between an upper position where the outer stopper comes into abutment against the actuator arm to inhibit the excess outward movement of the actuator arm and a lower position where the outer stopper does not come into abutment against the actuator arm to allow loading of the magnetic head over the magnetic disk.

In another aspect of the present invention, the outer stopper is mounted on the base of the magnetic disk drive so as to be pivotable about a horizontal axis between a vertical position where excess outward movement of the actuator arm is inhibited and a horizontal position where loading of the magnetic head over the magnetic disk is allowed. In still another aspect of the present invention, the outer stopper is mounted on the base of the magnetic disk drive so as to be pivotable about a vertical axis between a first position where excess outward movement of the actuator arm is inhibited and a second position where loading of the magnetic head over the magnetic disk is allowed.

According to the present invention, both the inner stopper and the outer stopper are mounted on the base of the magnetic disk drive so as to abut against the actuator arm in the vicinity of its front end portion. Accordingly, the position tolerance of the stoppers can be minimized to thereby widen the data zone of the magnetic disk. Further, the outer stopper is mounted on the base so as to be movable vertically, or pivotable about the horizontal axis or the vertical axis.

Accordingly, in loading the magnetic head over the magnetic disk, the outer stopper can escape so as not to interfere with the movement of the actuator arm, thereby allowing the magnetic head to be easily loaded over the magnetic disk.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
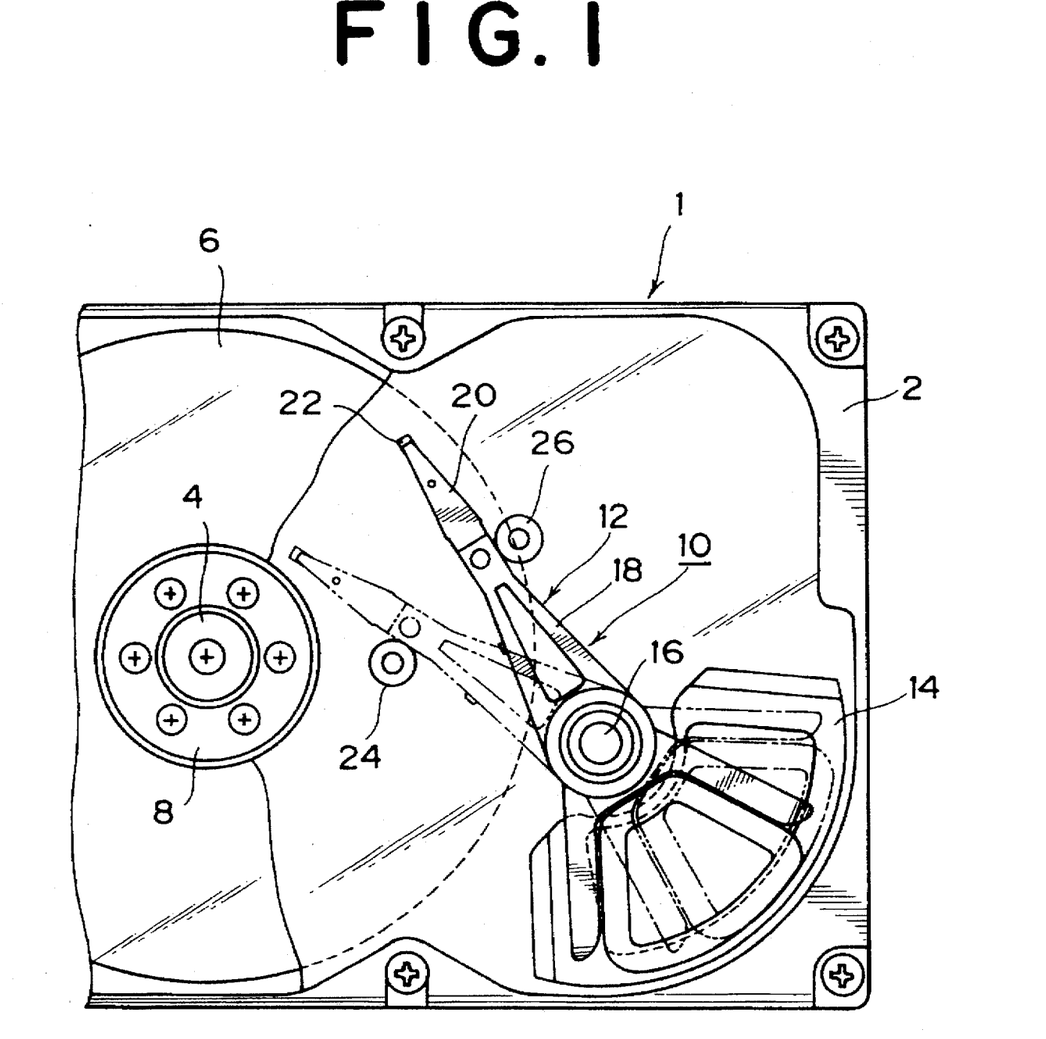
FIG. 1 is a partially cutaway plan view of a first preferred embodiment of the present invention.

Referring to FIG. 1, there is shown a partially cutaway plan view of a magnetic disk drive according to a first preferred embodiment of the present invention. Reference numeral 1 denotes a housing (enclosure) composed of a base 2 and a cover (not shown). A spindle shaft 4 is fixed to the base 2, and a spindle hub (not shown) is provided on the spindle shaft 4 so as to be rotatably driven by a spindle hub motor (not shown). A plurality of magnetic disks 6 and spacers (not shown) are alternately stacked and mounted on the spindle hub. That is, the plurality of magnetic disks 6 are regularly spaced from each other by the spacers and are fixedly mounted on the spindle hub by securing a disk clamp 8 to the spindle hub by screws.

Reference numeral 10 denotes a rotary head actuator composed of an actuator arm assembly 12 and a magnetic circuit 14. The actuator arm assembly 12 is rotatably mounted on a shaft 16 fixed to the base 2, and has a plurality of actuator arms 18 extending in one direction from the center of rotation. A plurality of suspensions 20 are fixed at their base ends to the front ends of the actuator arms 18, and a plurality of magnetic heads 22 are supported on the front ends of the suspensions 20. The magnetic heads 22 are moved across the tracks of the magnetic disks 6 by swinging the head actuator 10 about the shaft 16. Then, data is written onto and read from a data zone of the magnetic disks 6 by the magnetic heads 22.

Reference numeral 24 denotes an inner stopper fixed to the base 2 so as to abut against the lowermost actuator arm 18 in the vicinity of its front end portion. The inner stopper 24 functions to stop the magnetic heads 22 near the innermost cylinder, or the innermost tracks of the magnetic disks 6, thereby inhibiting excess inward movement of the magnetic heads 22 beyond the innermost cylinder of the magnetic disks 6. Reference numeral 26 denotes an outer stopper mounted on the base 2 so as to abut against the lowermost actuator arm 18 in the vicinity of its front end portion. The outer stopper 26 functions to stop the magnetic heads 22 near the outermost cylinder, or the outermost tracks of the magnetic disks 6, thereby inhibiting excess outward movement of the magnetic heads 22 beyond the outermost cylinder of the magnetic disks 6.

The structure and operation of the outer stopper 26 will now be described in detail with reference to FIGS. 2A to 2C. The bottom surface of the base 2 is integrally formed with a cylindrical projection 28. The lower end portion of the cylindrical projection 28 is formed with a recess 29 and a pair of diametrically aligned notches 30. The central portion of the cylindrical projection 28 is formed with an axially extending through hole 31, and a shaft 32 is inserted through the through hole 31. The lower end portion of the shaft 32 is formed with a diametrically extending through hole 33, and a pin 34 is inserted through the through hole 33.

An annular rubber stop 36 is fixed to the upper end portion of the shaft 32 by bonding. Instead of bonding, the rubber stop 36 may be fixedly mounted by its elasticity of rubber or may be fixed by rubber lining to the upper end portion of the shaft 32. A coil spring 38 is mounted about the shaft 32 between the base 2 and the rubber stop 36, and the shaft 32 is normally upward biased by the elastic force of the coil spring 38.

Figure 2A:
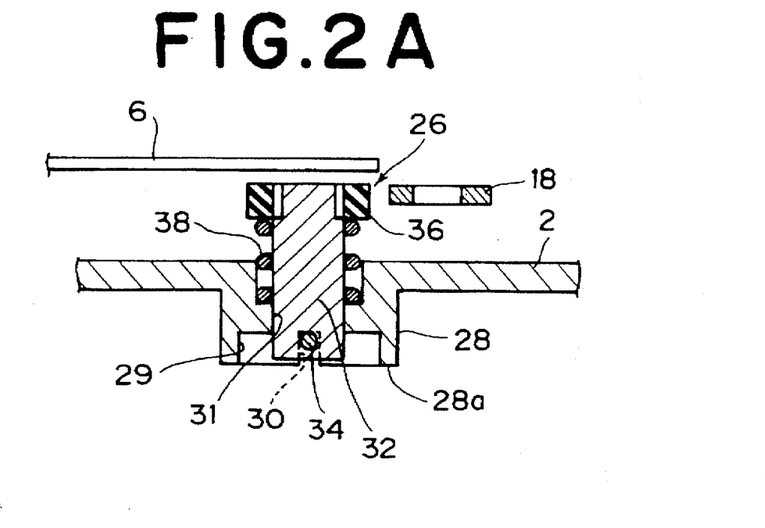
FIG. 2A is an enlarged sectional view of an outer stopper and its associated parts according to the first preferred embodiment, showing a condition before loading of magnetic heads over magnetic disks.

In the condition shown in FIG. 2A, both ends of the pin 34 inserted through the through hole 33 of the shaft 32 are engaged with the pair of notches 30 of the cylindrical projection 28. In this condition, the rubber stop 36 has an upper position where the abutment of the rubber stop 36 against the lowermost actuator arm 18 is allowed. FIG. 2A shows a positional relationship between the lowermost actuator arm 18 and the outer stopper 26 before loading the magnetic heads 22 over the magnetic disks 6.

Figure 2B:
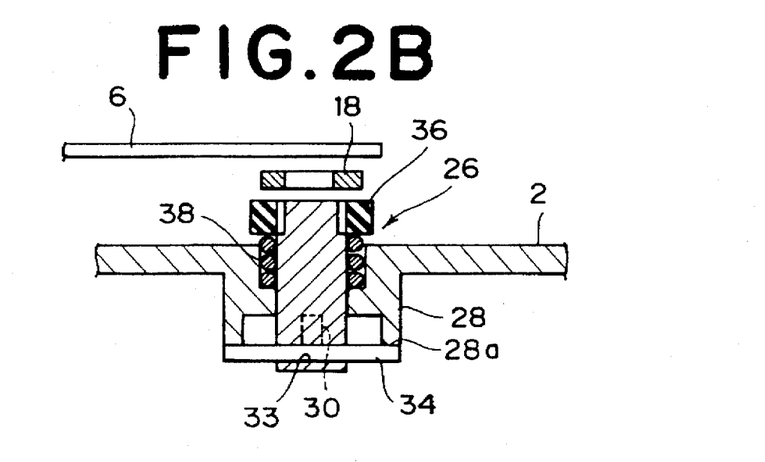
FIG. 2B is a view similar to FIG. 2A, showing a condition during loading of the magnetic heads over the magnetic disks.

In loading the magnetic heads 22 over the magnetic disks 6, the shaft 32 is pulled downward against the biasing force of the coil spring 38 to disengage the pin 34 from the notches 30 of the cylindrical projection 28, and the shaft 32 is then rotated to put the pin 34 into rest on an annular lower end 28a of the cylindrical projection 28 as shown in FIG. 2B. In this condition, the rubber stop 36 of the outer stopper 26 has a lower position where it does not abut against the lowermost actuator arm 18 to allow the loading of the magnetic heads 22 over the magnetic disks 6.

Figure 2C:
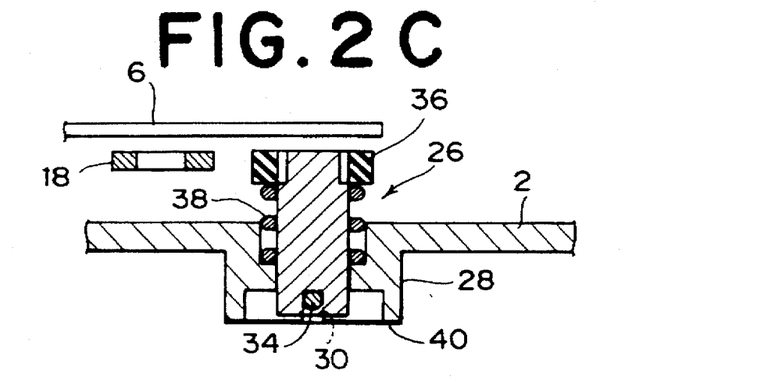
FIG. 2C is a view similar to FIG. 2A, showing a condition after loading of the magnetic heads over the magnetic disks.

After completing the loading of the magnetic heads 22 over the magnetic disks 6, the shaft 32 is rotated to bring the pin 34 into engagement with the notches 30 of the cylindrical projection 28 again as shown in FIG. 2C. Accordingly, the rubber stop 36 of the outer stopper 26 is returned to the original upper position by the biasing force of the coil spring 38, thus playing an original role of the outer stopper 26. After returning the rubber stop 36 of the outer stopper 26 to the upper position, a circular seal 40 for covering the recess 29 is attached to the annular lower end 28a of the cylindrical projection 28. Then, another seal for covering the notches 30 is attached to the cylindrical projection 28 and the seal 40. Thus, the cylindrical projection 28 of the base 2 of the magnetic disk drive is sealed.

According to this preferred embodiment, the outer stopper 26 is mounted on the base 2 so as to be movable between the upper position and the lower position. Accordingly, the magnetic heads 22 mounted on the front end portion of the head actuator 10 can be easily loaded over the magnetic disks 6 by moving the outer stopper 26 to the lower position. Furthermore, since both the inner stopper 24 and the outer stopper 26 are located so as to abut against the lowermost actuator arm 18 in the vicinity of its front end portion, the position tolerance of the stoppers can be minimized to thereby widen the data zone of the magnetic disks 6.

Figure 3:
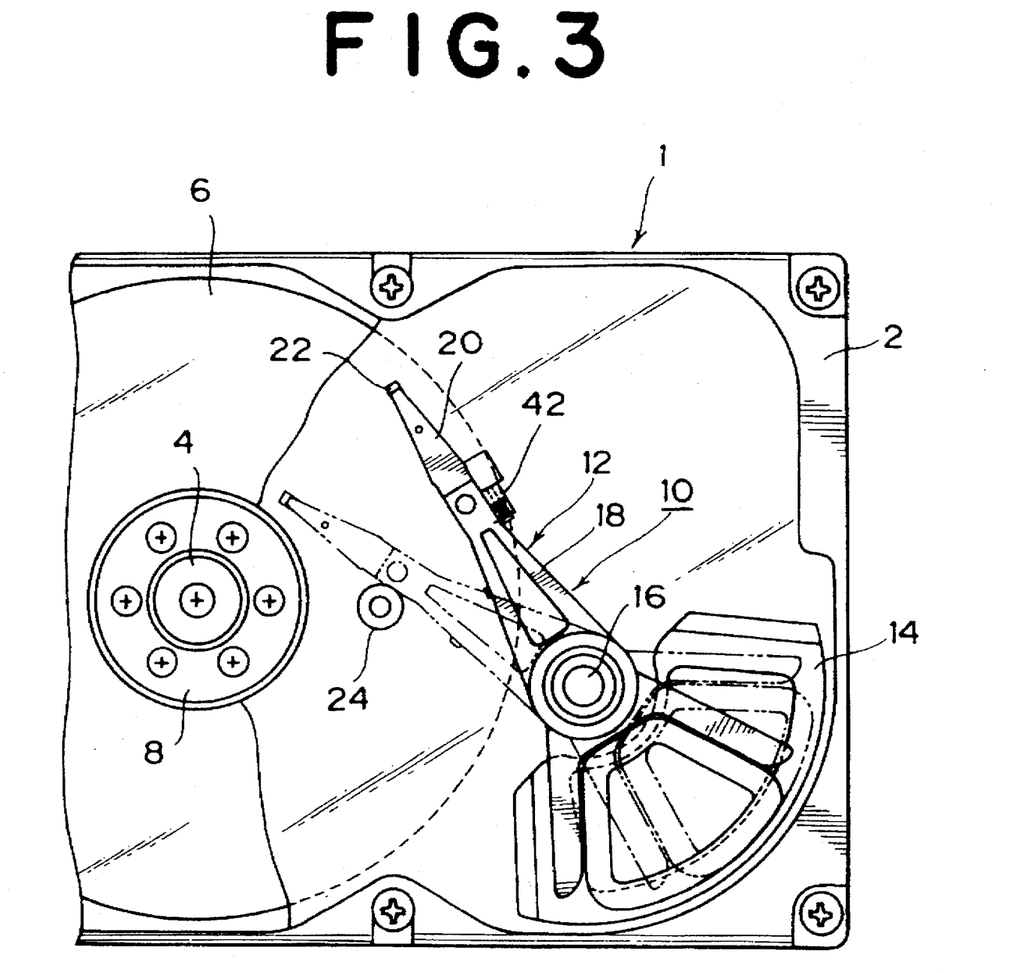
FIG. 3 is a partially cutaway plan view of a second preferred embodiment of the present invention.

Referring to FIG. 3, there is shown a partially cutaway plan view of a magnetic disk drive according to a second preferred embodiment of the present invention. In this preferred embodiment, an outer stopper 42 is mounted on the base 2 so as to be pivotable about a horizontal axis between a vertical position and a horizontal position. The other parts of this preferred embodiment are similar to those of the first preferred embodiment shown in FIG. 1, and the description thereof will therefore be omitted.

The structure and operation of the outer stopper 42 will now be described with reference to FIGS. 4A to 4C and 5. A block 44 is fixed to the base 2 by bonding, press fitting, etc. A shaft 46 projects horizontally from the block 44. A torsion coil spring 48 is mounted about the shaft 46, and one end portion 48a of the torsion coil spring 48 is fixedly engaged with the base 2. A stop member 50 is fixed to the other end portion 48b of the torsion coil spring 48. Accordingly, the stop member 50 is normally biased clockwise as viewed in FIG. 4A by the elastic force of the torsion coil spring 48. However, the clockwise rotation of the stop member 50 is limited by the abutment of a lower end 50a of the stop member 50 against the base 2, thus maintaining a vertical or upright position of the stop member 50. A rubber stop 52 is bonded to the upper end portion of the stop member 50.

Figure 4A:
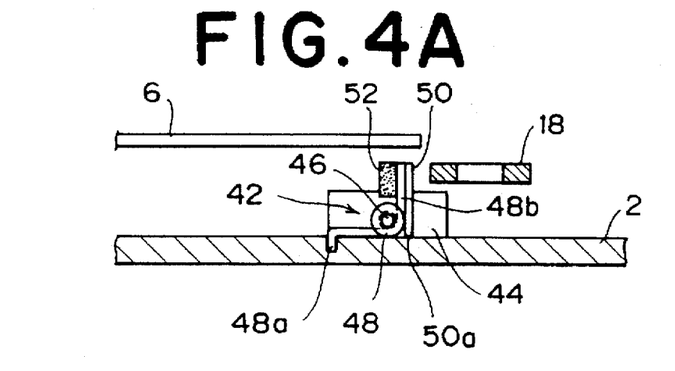
FIG. 4A is an enlarged sectional view of an outer stopper and its associated parts according to the second preferred embodiment, showing a condition before loading of the magnetic heads over the magnetic disks.
Figure 4B:
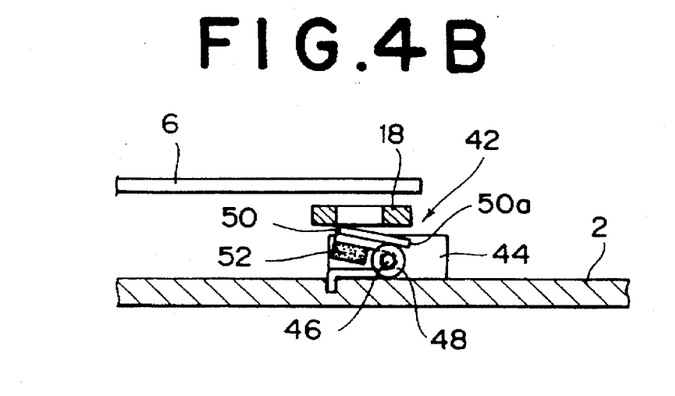
FIG. 4B is a view similar to FIG. 4A, showing a condition during loading of the magnetic heads over the magnetic disks.
Figure 4C:
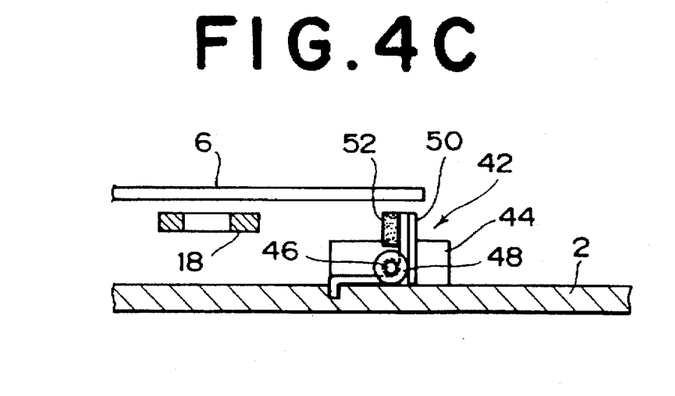
FIG. 4C is a view similar to FIG. 4A, showing a condition after loading of the magnetic heads over the magnetic disks.
Figure 5:
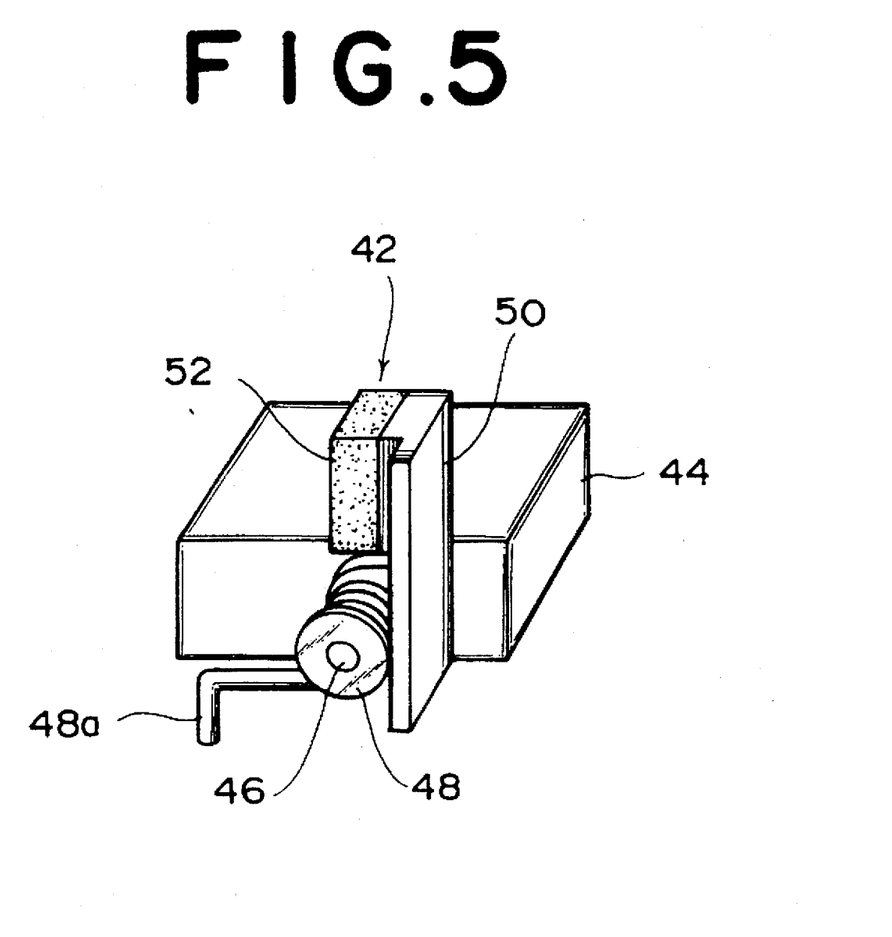
FIG. 5 is a perspective view of the outer stopper according to the second preferred embodiment.

FIG. 4A shows a positional relationship between the lowermost actuator arm 18 and the outer stopper 42 before loading the magnetic heads 22 over the magnetic disks 6. When the loading of the magnetic heads 22 is started from this condition, the stop member 50 is pushed by the lowermost actuator arm 18 to rotate counterclockwise as viewed in FIG. 4B about the horizontal shaft 46 to a horizontal or lowered position as shown in FIG. 4B, thereby allowing the lowermost actuator arm 18 to pass over the outer stopper 42 toward the innermost cylinder of the magnetic disks 6. Thus, the magnetic heads 22 can be loaded over the magnetic disks 6. After thus loading the magnetic heads 22, the stop member 50 is returned to the original vertical position by the biasing force of the torsion coil spring 48 as shown in FIG. 4C, thus playing an original role of the outer stopper 42. The outer stopper 42 according to this preferred embodiment has an effect similar to that of the outer stopper 26 according to the first preferred embodiment.

Figure 6:
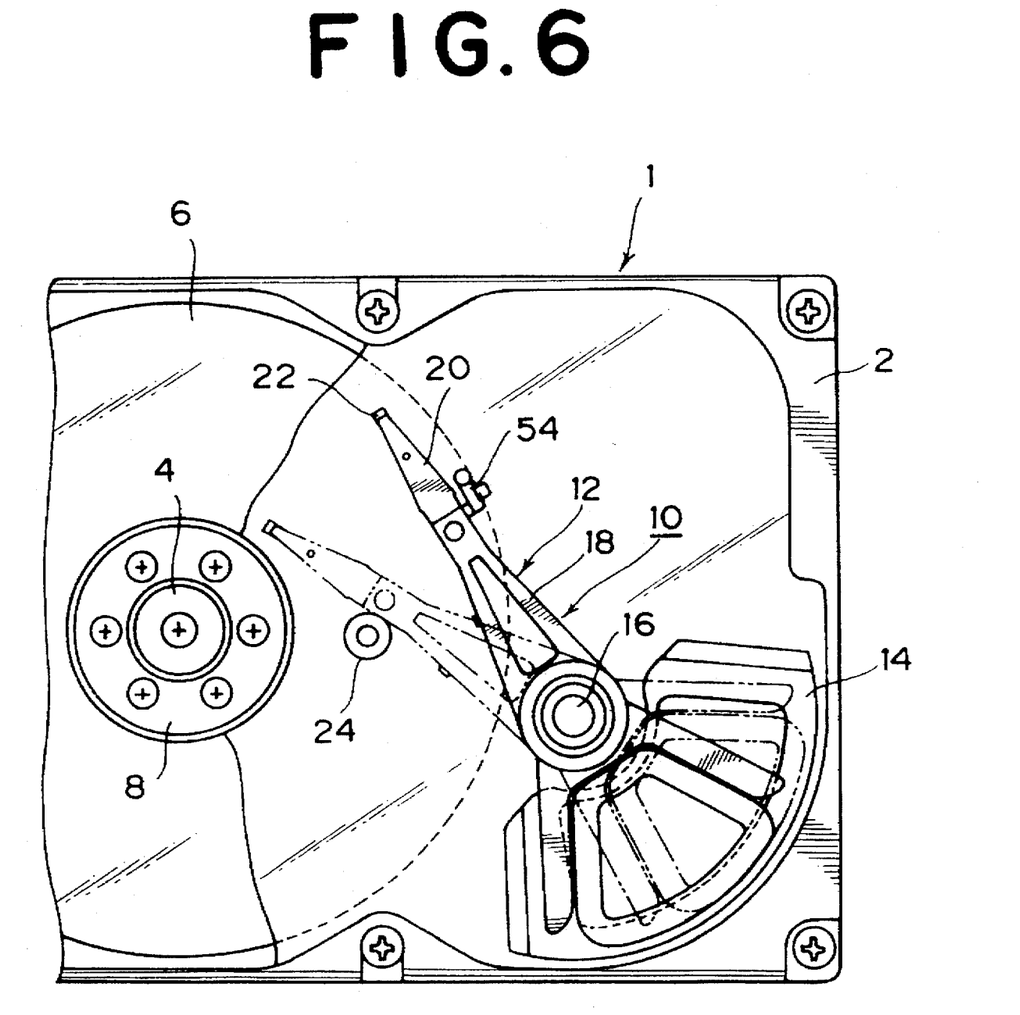
FIG. 6 is a partially cutaway plan view of a third preferred embodiment of the present invention.

Referring to FIG. 6, there is shown a partially cutaway plan view of a magnetic disk drive according to a third preferred embodiment of the present invention. An outer stopper 54 according to this preferred embodiment is mounted on the base 2 so as to be pivotable about a vertical axis. The other parts in this preferred embodiment are similar to those in the first preferred embodiment shown in FIG. 1, and the description thereof will therefore be omitted.

The structure and operation of the outer stopper 54 will now be described with reference to FIGS. 7A to 7C, 8, and 9. A vertical shaft 56 is press-fitted with the base 2, and a torsion coil spring 58 is mounted about the vertical shaft 56. One end portion 58a of the torsion coil spring 58 is fixedly engaged with the base 2, and a stop member 60 is fixed to the other end portion of the torsion coil spring 58. The stop member 60 has a vertically extending leg 60a, and a rubber stop 62 is bonded to one end portion of the stop member 60. Accordingly, the stop member 60 is normally biased counterclockwise as viewed in FIG. 6 by the elastic force of the torsion coil spring 58. However, the counterclockwise rotation of the stop member 60 is limited by the abutment of the leg 60a of the stop member 60 against a rotation limiting member 64 fixed to the base 2, thus maintaining a first position.

Figure 7A:
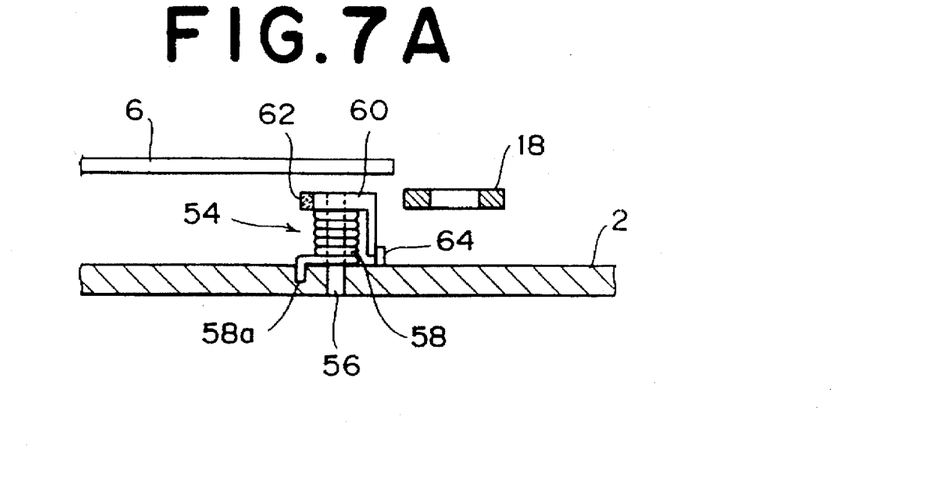
FIG. 7A is an enlarged sectional view of an outer stopper and its associated parts according to the third preferred embodiment, showing a condition before loading of the magnetic heads over the magnetic disks.
Figure 7B:
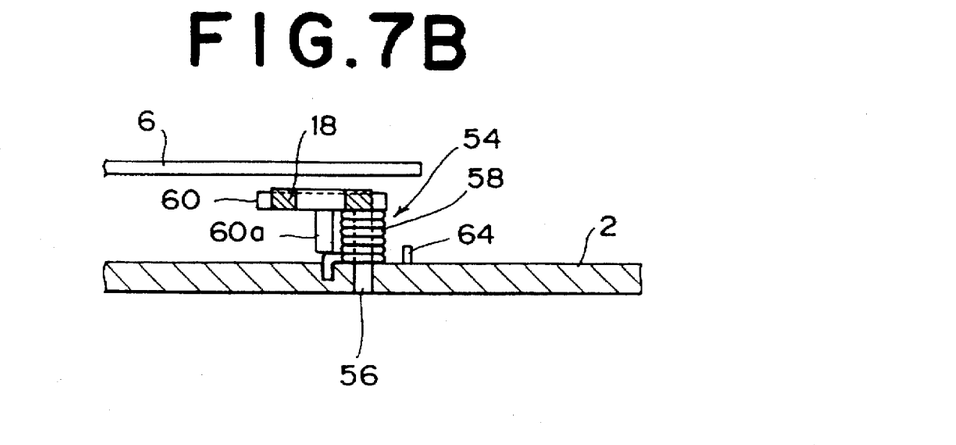
FIG. 7B is a view similar to FIG. 7A, showing a condition during loading of the magnetic heads over the magnetic disks.
Figure 9:
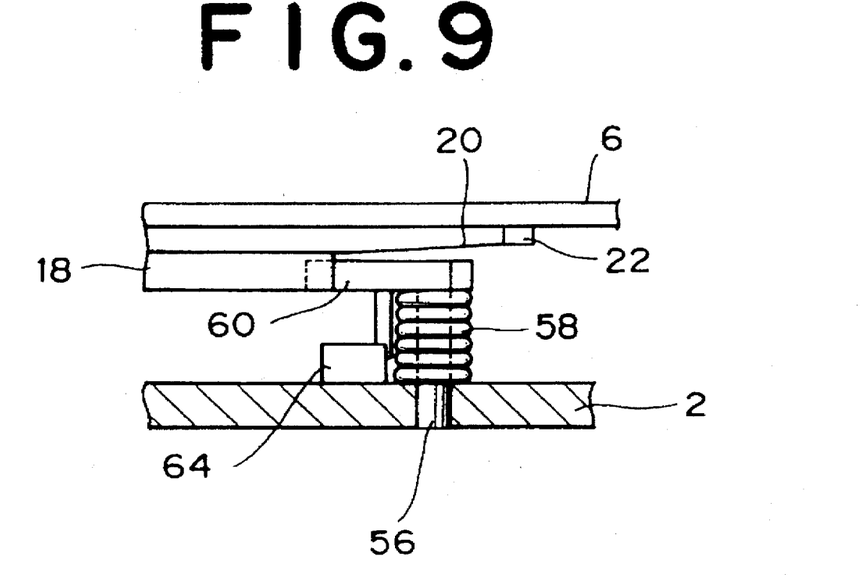
FIG. 9 is a right side view of FIG. 7B.

FIG. 7A shows a positional relationship between the lowermost actuator arm 18 and the outer stopper 54 before loading the magnetic heads 22 over the magnetic disks 6. When the loading of the magnetic heads 22 is started from this condition, the stop member 60 is pushed by the lowermost actuator arm 18 to rotate clockwise as viewed in FIG. 6 about the vertical shaft 56 to a second position, thereby allowing the lowermost actuator arm 18 to pass over the outer stopper 54 toward the innermost cylinder of the magnetic disks 6. As shown in FIG. 9, the vertical shaft 56 of the outer stopper 54 is located below a moving path of the lowermost suspension 20. Therefore, there is no possibility that the lowermost suspension 20 may come into contact with the stop member 60 during the rotation of the stop member 60 being pushed by the lowermost actuator arm 18.

Figure 7C:
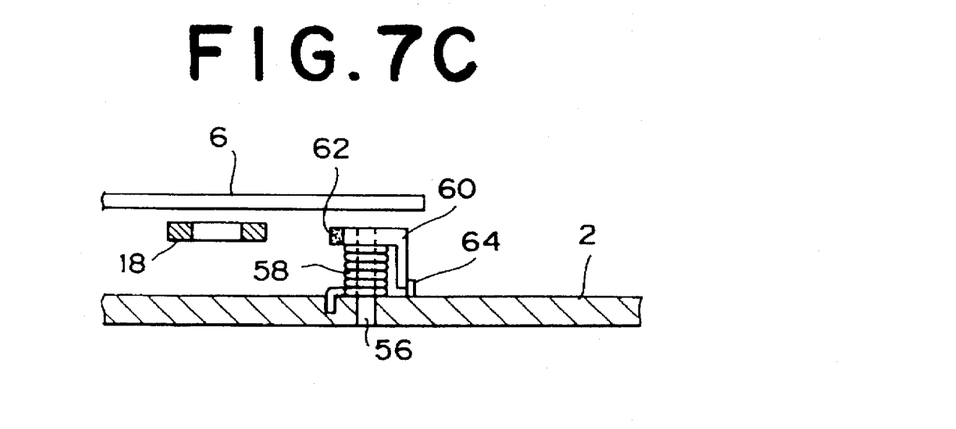
FIG. 7C is a view similar to FIG. 7A, showing a condition after loading of the magnetic heads over the magnetic disks.
Figure 8:
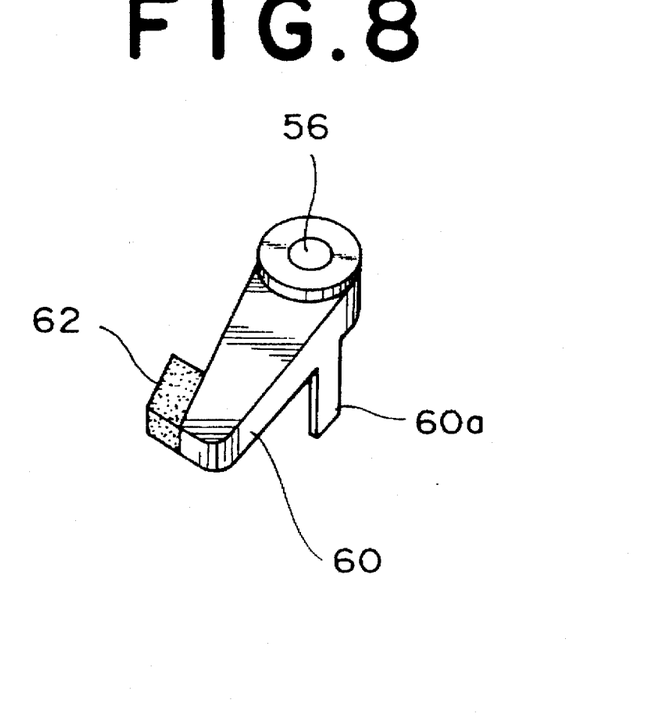
FIG. 8 is a perspective view of the outer stopper according to the third preferred embodiment.

Since the outer stopper 54 has such a positional relationship with the lowermost actuator arm 18 and the lowermost suspension 20, the lowermost actuator arm 18 can pass over the outer stopper 54 toward the innermost cylinder of the magnetic disks 6. Thus, the magnetic heads 22 can be loaded over the magnetic disks 6. After loading the magnetic heads 22, the stop member 60 is returned to the original first position by the biasing force of the torsion coil spring 58 as shown in FIG. 7C, thus playing an original role of the outer stopper 54. The outer stopper 54 according to this preferred embodiment also has an effect similar to that of the outer stopper 26 and 42 according to the first and the second preferred embodiment.

According to the present invention, both the inner stopper and the outer stopper are located so as to abut against the lowermost actuator arm in the vicinity of its front end portion. Accordingly, the position tolerance of the stoppers can be minimized to thereby allow an increase in recording capacity. Furthermore, the outer stopper is mounted on the base of the magnetic disk drive so as to be movable vertically, or pivotable about the horizontal axis or the vertical axis. Accordingly, in loading the magnetic heads over the magnetic disks, the interference between the outer stopper and the lowermost actuator arm can be avoided to thereby eliminate the difficulty in assembly of the magnetic disk drive.

What is claimed is:

1. A disk drive comprising:

a housing having a base;

a disk rotatably mounted in said housing and having a plurality of tracks;

a head for performing reading/writing of data on said disk;

a head actuator for moving said head across said tracks of said disk, said head actuator having an actuator arm rotatably mounted on said housing and a suspension having one end fixed to a front end of said actuator arm and having another end supporting said head;

an inner stopper adapted to abut against said actuator arm in the vicinity of said front end to inhibit excess inward movement of said actuator arm beyond an innermost one of said tracks of said disk;

an outer stopper mounted on said base and adapted to abut against said actuator arm in the vicinity of said front end to inhibit excess outward movement of said actuator arm beyond an outermost one of said tracks of said disk;

said outer stopper being movable between an upper position where said outer stopper comes into abutment against said actuator arm to inhibit said excess outward movement of said actuator arm and a lower position where loading of said head over said disk is allowed; and a pin fixed to said outer stopper and configured for locking said outer stopper in said lower position by engaging said base.

2. A disk drive according to claim 1, wherein said outer stopper comprises a shaft movable between said upper position and said lower position, a rubber stop mounted on an upper end portion of said shaft, and a coil spring for biasing said shaft to said upper position.

3. A disk drive according to claim 2 wherein said pin is matingly disposed within a diametrically extending through hole formed at a lower end portion of said shaft.

4. A disk drive according to claim 3 wherein said pin engages at least one notch formed on a protrusion depending downwardly from said base.

5. A disk drive according to claim 4 wherein said protrusion is generally cylindrical and coaxial with said shaft.

* * * * *